United States Patent [19]

Mashio

[11] Patent Number: 5,132,474

[45] Date of Patent: Jul. 21, 1992

[54] METHOD OF RECOVERING HYDROCARBON HALIDE

[75] Inventor: Fujio Mashio, Kyoto, Japan

[73] Assignee: Nippon Paint Co., Ltd., Osaka, Japan

[21] Appl. No.: 812,841

[22] Filed: Dec. 20, 1991

Related U.S. Application Data

[63] Continuation of Ser. No. 578,309, Sep. 6, 1990, abandoned.

[51] Int. Cl.$^5$ ............................................. C07C 17/38
[52] U.S. Cl. ................................ 570/178; 570/177; 570/180; 570/211; 570/238; 570/262; 570/263
[58] Field of Search ............... 570/177, 178, 180, 211, 570/238, 262, 263

[56] References Cited

U.S. PATENT DOCUMENTS

| | | | |
|---|---|---|---|
| 3,004,075 | 10/1961 | Marcali | 570/180 |
| 3,624,166 | 11/1977 | Fuhrmann et al. | 570/180 |
| 4,934,149 | 6/1990 | DeVault et al. | |

*Primary Examiner*—Alan Siegel
*Attorney, Agent, or Firm*—Wenderoth, Lind & Ponack

[57] ABSTRACT

The present invention provides a method of effectively recovering a hydrocarbon halide and the use of a specific aprotic polar compound for said method. Thus, the present invention provides a method of recovering a hydrocarbon halide comprising absorbing the hydrocarbon halide into an aprotic polar compound which has a 5 or 6 membered ring and a nitrogen atom at an alpha-position of a carbonyl group. In the present method, the absorbed hydrocarbon halide can be easily recovered by usual methods.

4 Claims, No Drawings

METHOD OF RECOVERING HYDROCARBON HALIDE

This application is a continuation of now abandoned application, Ser. No. 07/578,309 filed Sep. 6, 1990 now abandoned.

FIELD OF THE INVENTION

The present invention relates to an improved method of recovering hydrocarbon halides.

BACKGROUND OF THE INVENTION

Hydrocarbon chlorides (such as methylene chloride, 1,1,1,-trichloroethane, trichloroethylene, tetrachloroethylene and carbon tetrachloride) have been widely used as a dissolving agent of rubber and fatty acid or a cleaning agent for dry cleaning and precision machines and elements. The hydrocarbon chlorides have many advantages in low boiling point, high solubility or detergency, non-combustibility and so on, but have some disadvantages in toxicity and carcinogenicity. They are therefore used under very limited conditions, e.g. limited concentration in drainage. Air pollution based on the hydrocarbon chlorides is also one of the big problems and very strict regulations have been applied since April 1989 in Japan.

The hydrocarbon chlorides are recovered or removed by an active carbon absorption method which, however, is insufficient because the absorbing rate is poor and the recovering process is complicated.

Hydrocarbon fluorides or Fleons or Flons (such as trichloromonofluoromethane (Fleon 11), trichlorotrifluoroethane (Fleon 113) and dichlorodifluoromethane (Fleon 12)) have also been widely used for spraying, refrigerant, a foaming agent, a solvent and a cleaning agent for IC or precision machine and elements. The hydrocarbon fluorides have a wide boiling point range within −40° to 50 ° C. and very low toxicity. They also have high solubility with oil and organic material and therefore exhibit very high detergency. Accordingly, the hydrocarbon fluorides are very important in recent industries.

However, in 1974, Professor Lorland of California University warned that Fleon gas which was exhausted into air reached the stratosphere without being decomposed in the troposphere and was decomposed by a strong ultraviolet beam at the stratosphere, so as to cause the decomposition or destruction of the ozone layer. He added that the destruction of the ozone layer reduced the ultraviolet beam absorbing capacity of the ozone layer and adversely increased the ultraviolet beam which reached to the earth's surface, so as to adversely affect the ecosystem. This means that, in respect to human beings, bad effects such as increase of skin cancer would be increased. He further warned that the destruction of the ozone layer is a public pollution on the whole earth. After that, many researches and studies have been conducted to find that ozone holes above the south pole and increase of skin cancer have been observed. As the result, it is recognized that the phenomena are substantial and represent a serious danger to human beings and have been considered as important problems in many international congresses, such as Montreal Protocol and Den Haag International Congress.

It is strongly desired to inhibit the use of some Fleon and to develop Fleon substitutes. It also has been intensely studied to recover Fleo and not to exhaust it in the air.

SUMMARY OF THE INVENTION

The present invention provides a method of effectively recovering a hydrocarbon halide and the use of a specific aprotic polar compound for said method. Accordingly the present invention provides a method of recovering a hydrocarbon halide comprising absorbing the hydrocarbon halide into an aprotic polar compound which has a 5 or 6 membered ring and a nitrogen atom at an alpha-position of a carbonyl group. In the present method, the absorbed hydrocarbon halide can be easily recovered at a high recovery of more than 90% by usual methods.

The present invention also provides the use of an aprotic polar compound which has a 5 to 6 membered ring and a nitrogen atom at an alpha-position of a carbonyl group for recovering a hydrocarbon halide.

DETAILED DESCRIPTION OF THE INVENTION

According to the present invention, a specific compound, i.e. the aprotic polar compound which has a 5 or 6 membered ring and a nitrogen atom at an alpha-position of a carbonyl group, is employed as an absorbing agent of the hydrocarbon halide. The aprotic polar compound is known to the art, but generally is represented by the following chemical formula:

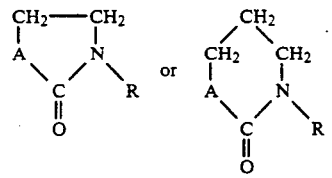

wherein A represents a methylene group or —NR— and R is an alkyl group having 1 to 3 carbon atoms. Typical examples of the aprotic polar compounds are 1,3-dimethyl-2-imidazolidinone (DMI), N-methyl-2-pyrrolidone (NMP), 1,3-dimethyl-2-oxohexahydropyrimidine and a mixture thereof. Preferred are those having a dipole moment of 3.7 to 4.8 D, especially 4.0 to 4.7 D, such as 1,3-dimethyl-2imidazolidinone (DMI), N-methyl-2-pyrrolidone (NMP) and 1,3-dimethyl-2-oxohexahydropyrimidine. If the dipole moment is outside the above range, absorption and desorption abilities of the hydrocarbon halide are deteriorated. Although a particular theory does not govern the present invention, it is believed that the dipole moment is one of important factors for which the absorption and desorption abilities are varied.

The hydrocarbon halide to be recovered is occasionally present in gaseous form together with other gas, such as air, inert gas and the like. The hydrocarbon halide of the present invention may be off-gas containing the hydrocarbon halide, which is produced from many industries (i.e. precision industry, dry cleaning, microlithographic process, etc.). In the present invention, the hydrocarbon halide containing gas is contacted with the aprotic polar compound (liquid) to absorb the hydrocarbon halide into the aprotic polar compound. The contact is generally carried out by gas-liquid contacting processes which are known to the art. It is usually conducted by an absorption train or absorption tower which is also known to the art.

In the present invention, the hydrocarbon halide is absorbed into the aprotic polar compound in a high absorption ratio, i.e. more than 90% by weight, preferably more than 95% by weight.

The absorbed hydrocarbon halide may be recovered or desorbed at very high recovery of more than 90% from the aprotic polar compound. The recovering step is carried out by distillation, evaporation or introduction of heated air or nitrogen. The recovered hydrocarbon halide and aprotic polar compound can be used again.

In the present invention, the hydrocarbon halide is absorbed in the aprotic polar compound in a very high absorption ratio and can be recover or desorbed very easily. The aprotic polar compound per se is known to the art as solvent for chemical reactions and the like, but has not been used as a solvent for the gaseous state of the hydrocarbon halide. It is surprising that the aprotic polar compound can absorb the hydrocarbon halide at a very high absorption ratio and easily desorb it.

EXAMPLES

The present invention is illustrated by the following Examples which, however, are not to be construed as limiting the present invention to their details.

EXAMPLES 1 to 16

A test tube having an inside diameter of 26 mm and a length of 200 mm was equipped with a gas inlet tube and a gas outlet tube, and the gas inlet tube reached to the bottom of the test tube. The hydrocarbon halide was charged in the test tube and air was introduced thereto to form a mixture gas of the hydrocarbon halide and air. The above process is called a gas producing step. The amount of the hydrocarbon and other conditions (temperature, etc.) are shown in Table 1.

The same test tubes as mentioned above equipped with a gas inlet tube and a gas outlet tube were charged with 20 ml of the aprotic polar compound of the present invention. Four to six test tubes were connected with Teflon tubes and kept at an absorption step temperature as shown in Table 1 to constitute an absorption step.

The mixture gas produced in the gas producing step was introduced and passed through the test tubes of the absorption step and an absorption amount of the hydrocarbon halide in each test tube was measured by gas chromatography. The results are shown in Table 2.

The same tests were conducted by changing the hydrocarbon halide and aprotic polar compound as shown in Table 1. The results are shown in Table 2.

TABLE 1

| Example No. | Hydrocarbon halide | (ml) | Temperature at evaporation (°C.) | Air flow rate (1/min) | Evaporation time (min) | Absorption temperature (°C.) | Aprotic polar compound |
|---|---|---|---|---|---|---|---|
| 1 | Trichloroethane | 5 | 2 | 1 | 40 | 20 | DMI |
| 2 | Trichloroethane | 5 | 20 | 1 | 35 | 20 | DMI |
| 3 | Trichloroethylene | 5 | 20 | 1 | 45 | 1 | NMP |
| 4 | Trichloroethylene | 5 | 30 | 1 | 23 | 20 | DMI |
| 5 | Tetrachloroethylene | 5 | 31 | 1 | 120 | 19 | DMI |
| 6 | Fleon 113 | 5 | −20 | 0.5 | 55 | 5 | DMI |
| 7 | Fleon 113 | 5 | 1 | 0.5 | 25 | 19 | DMI |
| 8 | Fleon 113 | 13 | 16.5 | 0.5 | 27 | 3 | NMP |
| 9 | Fleon 113 | 25 | 14 | 0.5 | 53 | 4 | NMP |
| 10 | Fleon 11 | 5 | 5 ± 1 | 0.3 | 15 | 1-2 | NMP |
| 11 | Fleon 11 | 5 | −2 ± 1 | 0.3 | 22 | 1-2 | NMP |
| 12 | Fleon 11 | 5 | −23 ± 1 | 0.3 | 56 | 1-2 | NMP |
| 13 | Fleon 113 | 10 | −10 ± 3 | 0.3 | 60 | 1-2 | NMP |
| 14 | Fleon 113 | 5 | −23 ± 2 | 0.5 | 60 | 0 | DMI + NMP* |
| 15 | Fleon 113 | 5 | −11 ± 1 | 0.5 | 18 | 2 | DMI + NMP |
| 16 | Fleon 113 | 5 | 2 | 0.3 | 21 | 1 | DMI + NMP |

*DMI + NMP shows a mixture of DMI 20 ml + NMP 4 ml.

TABLE 2

| Example No. | Gas concentration vol. % | wt. % | Absorption amount ml/20 ml · solv. Absorption test tube 1 | 2 | 3 | 4 | 5 | 6 | Total absorption amount (%) |
|---|---|---|---|---|---|---|---|---|---|
| 1 | 2.7 | 11.8 | 2.91 | 1.24 | 0.64 | 0.16 | — | — | 98.5 |
| 2 | 3.13 | 13.0 | 2.77 | 1.58 | 0.57 | 0.10 | — | — | 98.2 |
| 3 | 2.7 | 11.2 | 4.30 | 0.44 | 0.06 | 0.06 | — | — | 97.6 |
| 4 | 5.15 | 19.8 | 4.53 | 0.43 | trace | — | — | — | 99.2 |
| 5 | 0.91 | 4.99 | 1.91 | 1.65 | 0.83 | 0.25 | 0.08 | — | 94.2 |
| 6 | 3.3 | 10.2 | 1.76 | 1.23 | 0.85 | 0.52 | 0.26 | — | 96.3 |
| 7 | 7.0 | 32.7 | 1.42 | 1.27 | 0.97 | 0.54 | 0.32 | 0.10 | 92.4 |
| 8 | 15.3 | 54.0 | 8.65 | 2.74 | 0.90 | 0.19 | 0.06 | — | 96.5 |
| 9 | 15.0 | 53.5 | 14.2 | 5.51 | 2.30 | 0.89 | 0.31 | 0.10 | 93.2 |
| 10 | 21.1 | 61.7 | 3.69 | 0.96 | 0.30 | 0.02 | — | — | 99.8 |
| 11 | 15.4 | 45.5 | 3.53 | 1.02 | 0.19 | 0.15 | 0.04 | 0.02 | 99.4 |
| 12 | 6.72 | 25.5 | 1.92 | 1.47 | 0.70 | 0.28 | 0.11 | 0.06 | 90.5 |
| 13 | 11.8 | 38.9 | 3.34 | 3.11 | 1.96 | 0.99 | 0.37 | 0.09 | 98.6 |
| 14 | 3.41 | 18.1 | 1.21 | 1.34 | 0.89 | 0.54 | 0.22 | 0.10 | 85.9 |
| 15 | 10.5 | 40.4 | 3.37 | 1.14 | 0.36 | 0.10 | 0.02 | — | 99.7 |
| 16 | 16.0 | 47.4 | 3.51 | 0.99 | 0.16 | — | — | — | 93.2 |

In Table 2, the gas concentration shows the hydrocarbon halide content of the mixture gas of the gas producing step in volume % and weight %.

As is apparent from the above Tables, DMI and NMP are very good absorbing agents of the hydrocarbon halide. Especially, the Fleon 113 content of the first absorbing tube of Example 9 almost reaches 41.5%.

EXAMPLES 17

The same test tube as Example 1 was charged with 5 ml of Fleon 113 and 20 ml of DMI and heated to 53±1° C., to which air was passed through at 0.5 l/min for 60 minutes. The produced gas was introduced into 6 test tubes containing 20 ml of DMI at 5° C. to absorb Fleon 113.

Absorption amounts of the test tubes were respectively 139, 1.17, 1.06, 0.77, 0.33 and 0.1 (ml/20 ml DMI) and the total absorption amount was 97.8%.

This Example shows that Fleon 113 could be substantially completely recovered from a mixture solution of Fleon 113 and DMI (containing 20 volume % (27.2 wt %) of Fleon 113) by passing through 30 liters of air at 50° C.

EXAMPLE 18

A 200 ml glass vessel equipped with an air introducing tube and a mixed gas outlet tube was charged with 10 ml of tetrachloroethylene, through which air was passed at 24.3° C. at a flow rate of 0.4 l/min. After 340 minutes, tetrachloroethylene was completely evaporated to produce a mixed gas having a volume concentration of 1.72 vol %, a weight concentration of 9.17 wt % and 17,800 ppm.

The mixed gas was passed through 200 ml of N-methyl-2-pyrrolidone at 20.5° C. in an absorption tue. The outlet gas from N-methyl-2-pyrrolidone contained no tetrachloroethylene until 50 minutes from the start. Then, the concentration of tetrachloroethylene in the outlet gas slowly increased and reached a limit concentration of 50 ppm after 220 minutes, at which the concentration of the absorbed liquid phase reached 3.13 wt %. After 340 minutes, the concentration of tetrachloroethylene in the outlet gas was 200 ppm and the concentration of the absorbed liquid phase was 4.75%. Accordingly, the total absorption percentage of tetrachloroethylene in N-methyl-2-pyrrolidone reached 99.7%. The concentration of tetrachloroethylene in the outlet gas was determined by a Drager detection tube (made by Dragerwerke AG, Germany) detection tube and the concentration of the liquid phase was determined by gas chromatography.

EXAMPLE 19

As described in Example 18, 10 ml of tetrachloroethylene was charged in a glass vessel equipped with an air introducing tube and a mixed gas outlet tube, through which 160 liters of air was passed at 18° C. for 400 minutes at a flow rate of 0.4 l/min. Then, tetrachloroethylene was completely evaporated to produce a mixed gas having a volume concentration of 1.47 vol %, a weight concentration of 7.91 wt % and 15,100 ppm.

The mixed gas was passed through 200 ml of 1,3-dimethyl-2-imidazolidinone at 20.5° C. in an absorption tube. The outlet gas therefrom contained tetrachloroethylene in an amount of less than 5 ppm until 170 minutes from the start. Then, the concentration of tetrachloroethylene in the outlet gas linearly increased and reached 70 ppm after 315 minutes. After 400 minutes, the concentration of tetrachloroethylene in the outlet gas was 100 ppm and the concentration of the absorbed liquid phase was 4.75%. Accordingly, the total absorption percentage of tetrachloroethylene in 1,3-dimethyl-2-imidazolidinone reached 96.5%.

EXAMPLE 20

An evaporator was charged with 12.8 ml of trichloroethylene at 0° C., through which air was passed at a flow rate 2 l/min for 80 minutes to produce a mixed gas having a trichloroethylene content of 117 mg/l and an air content of 2.0 vol % and 21,800 ppm. The mixed gas was then passed through four absorption tubes which were series-connected and contained 40 ml of 1,3-dimethyl-2-imidazolidinone of 5° C. The amount of trichloroethylene was 9.46 ml in the first absorption tube, 2.3 ml in the second one, 0.34 ml in the third one and 0.12 ml in the fourth, one. Accordingly, the total absorption percentage was 95.5% and the outlet gas concentration of each absorption tube was respectively 5,700 ppm, 1,770 ppm, 1,200 ppm and 990 ppm.

EXAMPLE 21

A mixed gas having a 1,1,1-trichloroethane content of 500 ppm was prepared by mixing 20.4 μl of 1,1,1-trichloroethane and 10 l of air. The mixed gas (100 l) was passed through an absorption tube containing 20 ml of N-methyl-2-pyrrolidone at −25° C. The initial 50 l of the mixed gas was substantially completely absorbed, but the remaining 50 l was absorbed to give an outlet gas of 50 to 160 ppm. The outlet gas concentration was 46 ppm.

EXAMPLE 22

A three neck flask was equipped with a dropping funnel, a capillary and a rectifying column with which a low temperature trap (dry ice and acetone) and an absorption tube containing 40 ml of N-methyl-2-pyrrolidone at 0° C. were connected. The flask was put in a warm bath of 70° C., and a mixture of 70 ml of Fleon 113 and 100 ml of N-methyl-2-pyrrolidone were added dropwise over 60 minutes at 200 mmHg. Vaporized Fleon 113 was trapped by the low temperature trap and heated to fuse it, thus obtaining 65.1 ml of Fleon 113. The remaining Fleon 113 was absorbed with N-methyl-2-pyrrolidone in the absorption tube. The absorption amount was 0.6 ml determined by gas chromatography. The distillation residue contained 1.3 ml of Fleon 113 which was determined by gas chromatography.

The total Fleon 113 caught was 67 ml, i.e. 95.7%.

EXAMPLE 23

The same flask as in Example 22 was heated to 60° C., to which a mixture of 50 ml of Fleon 11 and 100 ml of 1,3-dimethyl-2-imidazolidinone was added dropwise over 45 minutes at 200 mmHg. The amount of Fleon 11 in the low temperature trap was 45.5 ml, the amount of it in the absorption tube was 0.2 ml and the distillation residue contained 1.3 ml of Fleon 11. The total Fleon 11 caught was 47 ml which is equivalent to 94%.

EXAMPLE 24

A 500 ml three neck flask was equipped with a capillary and a 50 cm rectifying column with which a cooling trap (−20° C.) and a low temperature trap (−70° C.) were connected. A mixture of 50 g of 1,1,1-trichloroethane and 100 ml of N-methyl-2-pyrrolidone was charged in the flask and distilled at 150 mmHg. The flask was heated to 120° C. and then slowly elevated to 150° C. a which distillation continued for one hour. The top temperature of the rectifying column was within 28° to 32° C. at which 1,1,1-trichloroethane was distilled out to the cooling trap. The cooling trap contained 38.2 g of 1,1,1-trichloroethane and the low temperature trap contained 5.7 g of 1,1,1-trichloroethane. The distillation residue contained 3.2 g of 1,1,1-trichloroethane which was determined by gas chromatography. The total 1,1,1-trichloroethane caught was 94.2%.

EXAMPLE 25

The same flask as in Example 24 was charged with a mixture of 120 g of tetrachloroethylene and 200 g of 1,3-dimethyl-2-imidazolidinone and distilled at a reduced pressure of 150 mmHg. The flask was heated to 170° C. from 120° C., at which distillation continued for 1.5 hours. The top temperature of the rectifying column was within 50 to 60 ° C. at which tetrachloroethylene was distilled out to the cooling trap. The cooling trap contained 98 g of tetrachloroethylene and the low temperature trap contained 11.6 g of tetrachloroethylene. The distillation residue contained 6.5 g of tetrachloroethylene which was determined by gas chromatography. The total tetrachloroethylene caught was 96.8%.

What is claimed is:

1. A method of recovering a hydrocarbon halide present in gaseous form in air or inert gas, comprising the following steps:
   (a) contacting said air or inert gas containing said hydrocarbon halide with a solution containing an aprotic polar compound represented by the formula

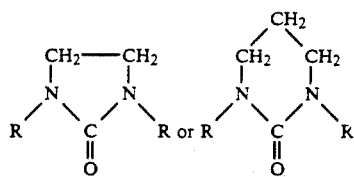

wherein R is an alkyl group having 1 to 3 carbon atoms, to absorb said hydrocarbon halide into said aprotic polar compound, and
   (b) recovering said hydrocarbon halide from said aprotic polar compound.

2. The method according to claim 1 wherein said hydrocarbon halide is recovered from said aprotic polar compound by distillation.

3. The method according to claim 1 wherein said aprotic polar compound has a dipole moment of 3.7 to 4.8 D.

4. The method according to claim 1 wherein said aprotic polar compound is selected from the group consisting of 1,3-dimethyl-2-imidazolidinone and 1,3-dimethyl-2oxohexahydropyrimidine.

* * * * *